United States Patent
Chen et al.

(10) Patent No.: US 12,431,808 B2
(45) Date of Patent: Sep. 30, 2025

(54) CONTROL METHODS FOR INTERLEAVED POWER CONVERTER

(71) Applicant: Leadtrend Technology Corporation, Zhubei (TW)

(72) Inventors: Da-Jin Chen, Zhubei (TW); Ruei-Jhih Jheng, Zhubei (TW); Ming-Chang Tsou, Zhubei (TW)

(73) Assignee: LEADTREND TECHNOLOGY CORPORATION, Zhubei (TW)

( * ) Notice: Subject to any disclaimer, the term of this patent is extended or adjusted under 35 U.S.C. 154(b) by 327 days.

(21) Appl. No.: 18/331,347

(22) Filed: Jun. 8, 2023

(65) Prior Publication Data
US 2024/0072672 A1 Feb. 29, 2024

(30) Foreign Application Priority Data
Aug. 31, 2022 (TW) .................................. 111132841

(51) Int. Cl.
*H02M 3/158* (2006.01)

(52) U.S. Cl.
CPC ........ *H02M 3/1586* (2021.05); *H02M 3/1584* (2013.01)

(58) Field of Classification Search
CPC .......................... H02M 3/1584; H02M 3/1586
See application file for complete search history.

(56) References Cited

U.S. PATENT DOCUMENTS

| | | | |
|---|---|---|---|
| 8,248,040 B2* | 8/2012 | Rausch ............... | H02M 3/1584 323/272 |
| 2009/0257257 A1* | 10/2009 | Adragna ............. | H02M 3/1584 363/65 |
| 2010/0244789 A1* | 9/2010 | Osaka ................. | H02M 3/1584 323/271 |

* cited by examiner

Primary Examiner — Gary A Nash
(74) Attorney, Agent, or Firm — McClure, Qualey & Rodack, LLP (57) ABSTRACT

A control method is in use of an interleaved power converter with first and second power stages for generating an output power source. A compensation is generated in response to a feedback signal and a reference voltage, and the feedback signal represents the output power source. The output power of the first power stage is controlled to supply to the output power source in response to the compensation signal. The operation status of the second power stage is switched in response to the compensation signal and the feedback signal, and is prevented from being switched when the feedback signal is beyond a stable range covering the reference voltage.

20 Claims, 6 Drawing Sheets

CONTROL METHODS FOR INTERLEAVED POWER CONVERTER

CROSS-REFERENCE TO RELATED APPLICATION

This application claims priority to and the benefit of Taiwan Patent Application Number 111132841 filed on Aug. 31, 2022, which is incorporated by reference in its entirety.

BACKGROUND

The present disclosure relates generally to a control method in the use of an interleaved power converter, and more particularly to a control method that switches an operation status of the interleaved power converter in response to the stability of an output power source.

Interleaved power converters are often used in high-power applications, utilizing two or more power stages connected in parallel to convert electrical energy and supply power to an output load, while maintaining phase differences among the operations of the power stages. This can reduce the ripple current of the input and the output. Furthermore, splitting the source of the output current into two or more paths can also reduce AC losses in the inductors and $I^2R$ loss in the resistor, resulting in high conversion efficiency.

A conventional interleaved power converter typically consists of master and slave power stages. In order to save switching loss, when the output load is light or unloaded, the interleaved power converter can disable the slave power stage, providing energy conversion solely from the master power stage to supply power to the output load. When the output load is heavy, the interleaved power converter can enable both the master and slave power stages to provide energy conversion together to supply power to the output load. The joining or disabling of the slave power stage, however, may cause significant voltage or current surges at the output and, in certain load conditions, periodic enabling and disabling of the slave power stage may occur, which should be avoided.

Furthermore, the circuit components in the slave power stage and master power stage may differ, which could cause one of the power stages to operate in an undesired continuous conduction mode (CCM), or make it difficult to maintain an approximately 180-degree phase difference between their operations.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure, or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures, or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

In one embodiment of the invention, an interleaved power converter with parallel first and second power stages is controlled by a power controller. A compensation signal is generated by comparing a reference voltage with a feedback signal, which represents an output power source of the interleaved power converter. In response to the compensation signal, the power controller controls the output power of the first power stage, and switches the operation status of the second power stage between an enabled state and a disabled state. When the feedback signal is within a stable range covering the reference voltage, the interleaved power converter is assumed to be in a stable state, and the operation status of the second power stage is switched in response to the compensation signal. Nevertheless, when the feedback signal is not within the stable range, the interleaved power converter is assumed to be transient, and the power controller prohibits the operation status from being switched.

In another embodiment of the invention, an interleaved power converter with parallel first and second power stages is controlled by a power controller. Each power stage has a power switch and an inductive device. The power controller records a second discharge time of the second inductive device of the second power stage and ensures that a first OFF time of the first power switch of the first power stage is not less than the second discharge time so that the second power stage surely does not operate in continuous conduction mode (CCM). The power controller can cause both the first and second power stages to operate in critical mode (CRM) or in discontinuous conduction mode (DCM).

Figure 1:
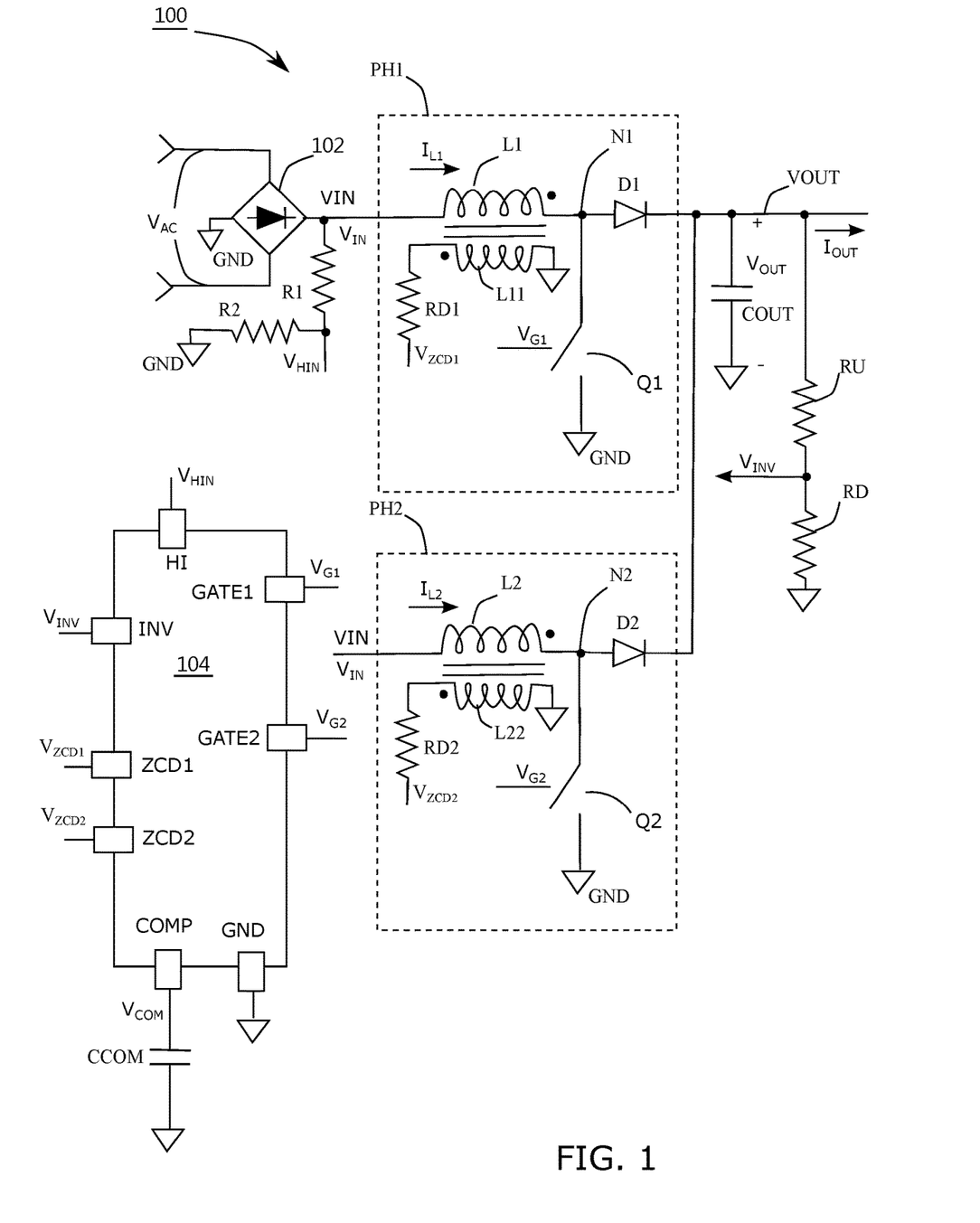
FIG. 1 illustrates interleaved power converter 100 according to embodiments of the invention.

FIG. 1 illustrates interleaved power converter 100 according to embodiments of the invention, which has power stages PH1 and PH2 connected in parallel. Bridge rectifier 102 rectifies AC mains $V_{AC}$ to provide input power source VIN and input ground GND, and each of power stages PH1 and PH2 is capable of converting input power source VIN into output power source VOUT, which supplies output current $I_{OUT}$ to a load (not shown). In interleaved power converter 100, each power stage is a boost converter, but this invention is not limited to. In another embodiment, each power stage can be a buck converter, flyback converter, or buck-boost converter.

In interleaved power converter 100, input voltage $V_{IN}$ of input power source VIN can be divided by voltage-dividing resistors R1 and R2 to generate high-voltage signal $V_{HIN}$ provided to pin HI of power controller 104. Feedback signal $V_{INV}$ is provided to pin INV of power controller 104 by voltage-dividing resistors RU and RD based on output voltage VOUT of output power source VOUT. Feedback signal $V_{INV}$ is approximately proportional to output voltage $V_{OUT}$ and is determined by voltage-dividing resistors RU and RD, so feedback signal $V_{INV}$ is in association with output power source VOUT or a representative of the output power source VOUT. Power controller 104 generates compensation signal $V_{COM}$ over compensation capacitor CCOM in response to feedback signal $V_{INV}$. According to one embodiment of the invention, power controller 104 is a packaged integrated circuit with pins GATE1, GATE2, GND, COMP, ZCD1, ZCD2, HI, and INV, as shown in FIG. 1.

In FIG. 1, power stage PH1 includes inductor L1, rectifier diode D1, power switch Q1, winding L11 inductively coupled to inductor L1, and sensing resistor RD1, connected as shown in FIG. 1. Power switch Q1 is controlled by gate signal $V_{G1}$ from power controller 104 to determine whether inductor L1 stores or releases energy. Rectifier diode D1 charges output capacitor COUT with inductor current $I_{L1}$ when inductor L1 releases energy. Through winding L11 and sensing resistor RD1, power controller 104 can detect zero-current signal $V_{ZCD1}$ to know the moments when node N1 has a local minimum, roughly estimating discharge time $T_{DIS1}$ of inductor L1 charging output capacitor COUT (which will be explained later). Similarly, power stage PH2 includes inductor L2, rectifier diode D2, power switch Q2, winding L22 inductively coupled to inductor L2, and sensing resistor RD2, connected as shown in FIG. 1. The operation of power stage PH2 can be understood by referring to the previous description of power stage PH1, and is not repeatedly explained for brevity.

Figure 2:
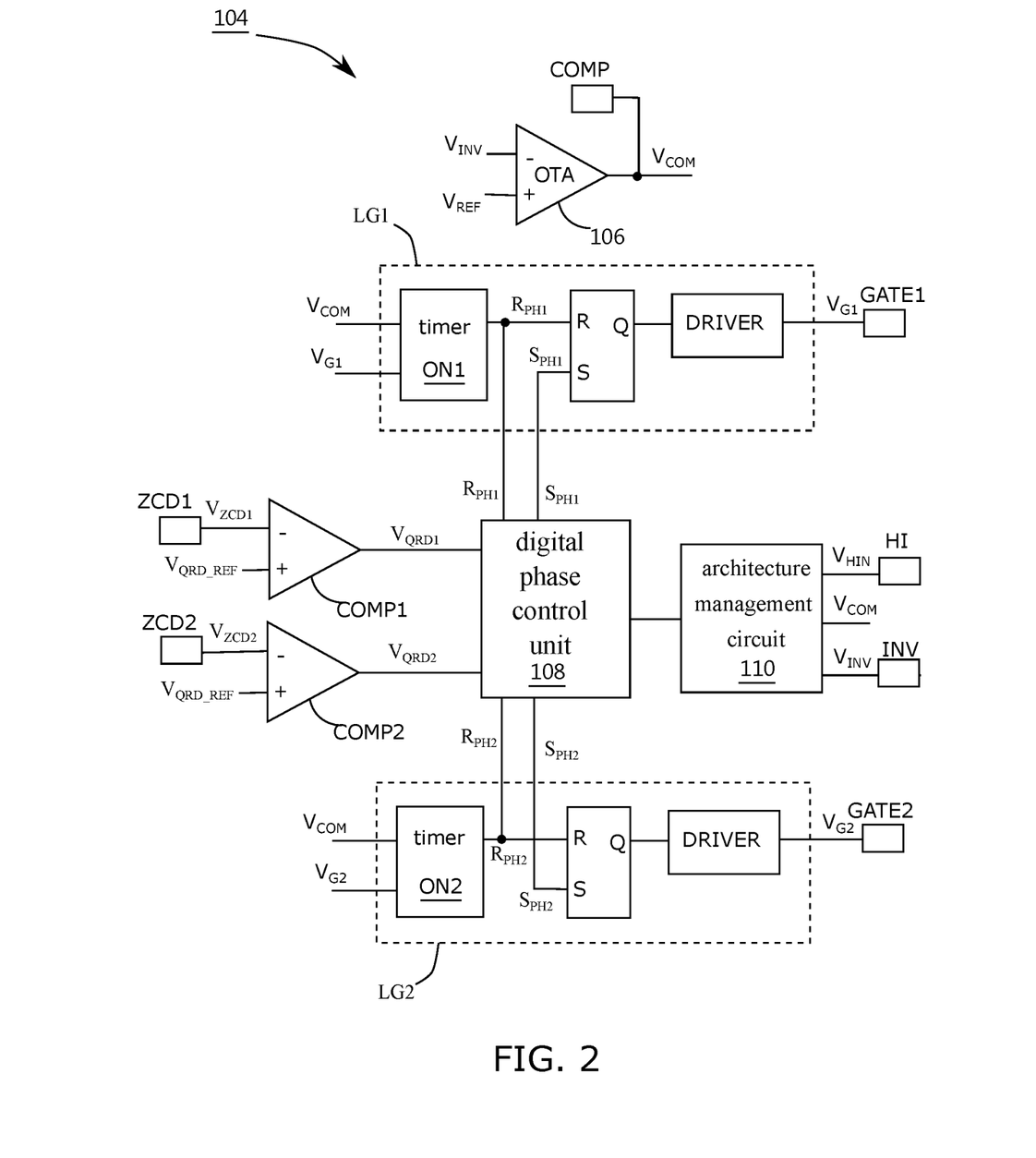
FIG. 2 shows a power controller in FIG. 1.
Figure 3:
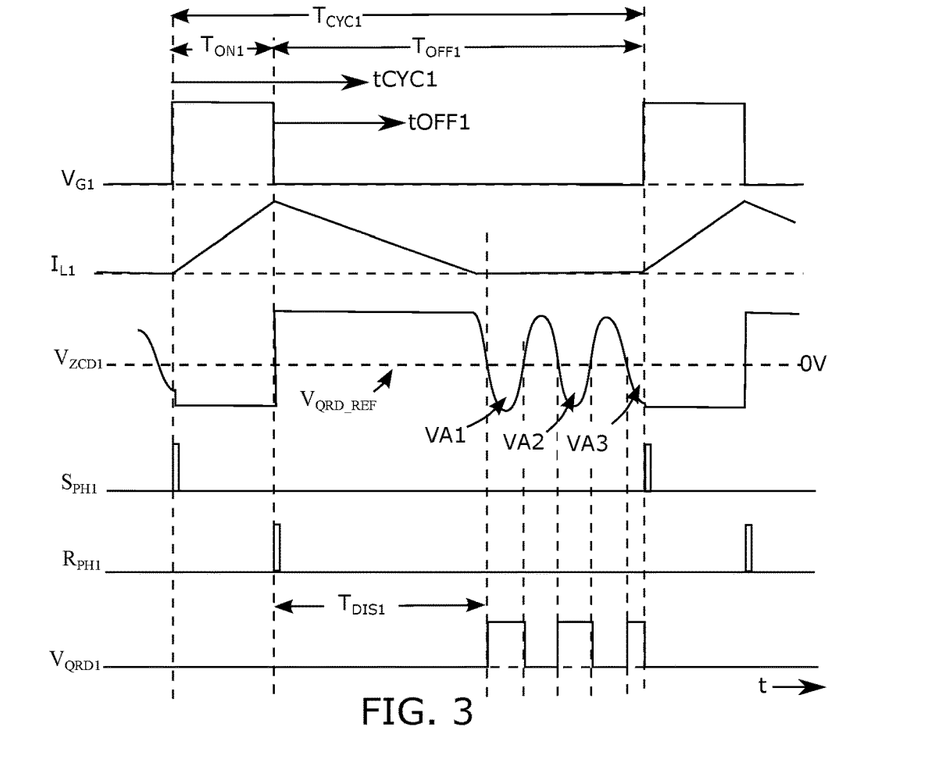
FIG. 3 shows waveforms of gate signal $V_{G1}$, inductor current $I_{L1}$, zero-current detection signal $V_{ZCD1}$, set signal Spill, reset signal $R_{PH1}$, and resonance detection signal $V_{QRD1}$, all used for operating power stage PH1.

FIG. 2 shows power controller 104 in FIG. 1, including operational transconductance amplifier (OTA) 106, ON-time controllers LG1 and LG2, valley detectors COMP1 and COMP2, digital phase control unit 108, and architecture management circuit 110. FIG. 3 shows waveforms of gate signal $V_{G1}$, inductor current $I_{L1}$, zero-current detection signal $V_{ZCD1}$, set signal $S_{PH1}$, reset signal $R_{PH1}$, and resonance detection signal $V_{QRD1}$, all used for operating power stage PH1. The operation of power stage PH1 is used to explain how power controller 104 in FIG. 2 controls power conversion, and the operation of power stage PH2 can be inferred from that of power stage PH1 unless otherwise specified.

OTA 106 in FIG. 2 compares feedback signal $V_{INV}$ with reference voltage $V_{REF}$, generating a current that charges or discharges compensation capacitor CCOM, and establishing compensation signal $V_{COM}$ at pin COMP, which is also a terminal of compensation capacitor CCOM.

ON-time controller LG1 in FIG. 2 determines ON time $T_{ON1}$ of power switch Q1 based on compensation signal $V_{COM}$, thus controlling the output power of power stage PH1. As shown in FIGS. 2 and 3, digital phase control unit 108 timely sends set signal $S_{PH1}$ with a short pulse to ON-time controller LG1, causing gate signal $V_{G1}$ to become "1" in logic and begin ON time $T_{ON1}$. When the duration that gate signal $V_{G1}$ stays as "1" in logic has reached a length determined by compensation signal $V_{COM}$, timer ON1 generates reset signal $R_{PH1}$. On one hand, reset signal $R_{PH1}$ notifies digital phase control unit 108 to record the length of ON time $T_{ON1}$, and on the other hand, it causes gate signal $V_{G1}$ to become "0" in logic, ending ON time $T_{ON1}$ and starting OFF time $T_{OFF1}$.

Valley detector COMP1 in FIG. 2, a comparator, generates resonance detection signal $V_{QRD1}$ based on zero-current detection signal $V_{ZCD1}$ and valley reference voltage $V_{QRD\_REF}$. Resonance detection signal $V_{QRD1}$ can indicate the time when the voltage at node N1 in FIG. 1 has a local minimum or a valley. As shown in FIG. 3, after OFF time $T_{OFF1}$ starts, zero-current detection signal $V_{ZCD1}$ remains at a constant value in the beginning while inductor current $I_{L1}$ gradually decreases. When inductor current $I_{L1}$ becomes zero, zero-current detection signal $V_{ZCD1}$ oscillates and can generate many local minimums, each representing a valley, as shown in FIG. 3 with valleys VA1, VA2 and VA3. Once zero-current detection signal $V_{ZCD1}$ falls below valley reference voltage $V_{QRD\_REF}$, resonance detection signal $V_{QRD1}$ has a pulse, roughly representing the appearance of a corresponding valley. The time between the start of OFF time $T_{OFF1}$ and the first pulse at resonance detection signal $V_{QRD1}$ can be regarded as discharge time $T_{DIS1}$ of inductor L1, as shown in FIG. 3. If digital phase control unit 108 sends set signal $S_{PH1}$ with a short pulse to end OFF time $T_{OFF1}$ shortly after the end of discharge time $T_{DIS1}$, roughly when valley VA1 appears, then power stage PH1 operates in CRM. If set signal $S_{PH1}$ with a short pulse appears to end OFF time $T_{OFF1}$ later than the appearance of valley VA1, power stage PH1 operates in DCM. FIG. 3 shows power stage PH1 operates in DCM because the short pulse of set signal $S_{PH1}$ appears around when valley VA3 appears, ending OFF time $T_{OFF1}$. In summary, digital phase control unit 108 can end OFF time $T_{OFF1}$ at the time when a local minimum (valley) appears on the signal at node N1, ensuring power stage PH1 achieves zero voltage switching (ZVS).

Likewise, compensation signal $V_{COM}$ determines ON time $T_{ON2}$ of power switch Q2. Resonance detection signal $V_{QRD2}$ provided by Valley detector COMP2 can approximately indicate the time when a local minimum of the voltage at node N2 appears. Digital phase control unit 108 can make OFF time $T_{OFF2}$ end at the time when a local minimum appears at node N2.

Implementing ZVS or valley-switching in power stages PH1 and PH2 is just one embodiment of the invention, and this invention is not limited to. In another embodiment of the invention, digital phase control unit 108 can cause OFF time $T_{OFF1}$ to end at any moment after the end of discharge time $T_{DIS1}$, not necessarily at the time of a local minimum appearing at node N1.

In one embodiment, digital phase control unit 108 is a microprocessor that processes signals based on a processor clock much higher than the switching frequency of power stages PH1 and PH2. For example, the switching frequency of power stages PH1 and PH2 is about 100 kHz, while the processor clock used by digital phase control unit 108 is about 10 MHz. Digital phase control unit 108 has several counters that count, based on the processor clock, present cycle time tCYC1 and present OFF time tOFF1 of power stage PH1, and present cycle time tCYC2 and present OFF time tOFF2 of power stage PH2. Based on the counters, digital phase control unit 108 also records ON time $T_{ON1}$, discharge time $T_{DIS1}$, cycle time $T_{CYC1}$, ON time $T_{ON2}$, discharge time $T_{DIS2}$, and cycle time $T_{CYC2}$ that have been confirmed in the past. For example, in FIG. 3, when digital phase control unit 108 sends set signal $S_{PH1}$ with a short pulse, cycle time $T_{CYC1}$ is updated by present cycle time tCYC1, which then increases from zero. When digital phase control unit 108 sends reset signal $R_{PH1}$ with a short pulse, ON time $T_{ON1}$ is recorded based on present cycle time tCYC1, and present OFF time tOFF1 increases from zero. Upon receiving the first pulse from resonance detection signal $V_{QRD1}$, digital phase control unit 108 updates discharge time $T_{DIS1}$ using present OFF time tOFF1.

In FIG. 2, architecture management circuit 110 switches the operation of interleaved power converter 100 based on high-voltage signal $V_{HIN}$, compensation signal $V_{COM}$, and feedback signal $V_{INV}$. Interleaved power converter 100 can operate in three modes: dual mode (DM), single mode (SM), and shut-down mode (SDM). DM means using power stages PH1 and PH2 interleaved to perform power conversion, both power stages PH1 and PH2 being enabled. SM means power stage PH2 is disabled, and only power stage PH1 is enabled to perform power conversion. SDM means both power stages PH1 and PH2 are disabled and no power conversion is performed. In other words, architecture management circuit 110 can switch the operation statuses of power stages PH1 and PH2 between enable and disable in view of high-voltage signal $V_{HIN}$, compensation signal $V_{COM}$, and feedback signal $V_{INV}$. For example, architecture management circuit 110 can disable power stage PH2 by preventing digital phase control unit 108 from providing short-pulse set signal $SP_{H2}$ which starts ON time $T_{ON2}$. If the operation status of power stage PH2 is switched from enable to disable while power stage PH1 remains enabled, the operation mode of interleaved power converter 100 is switched from DM to SM.

Figure 4:
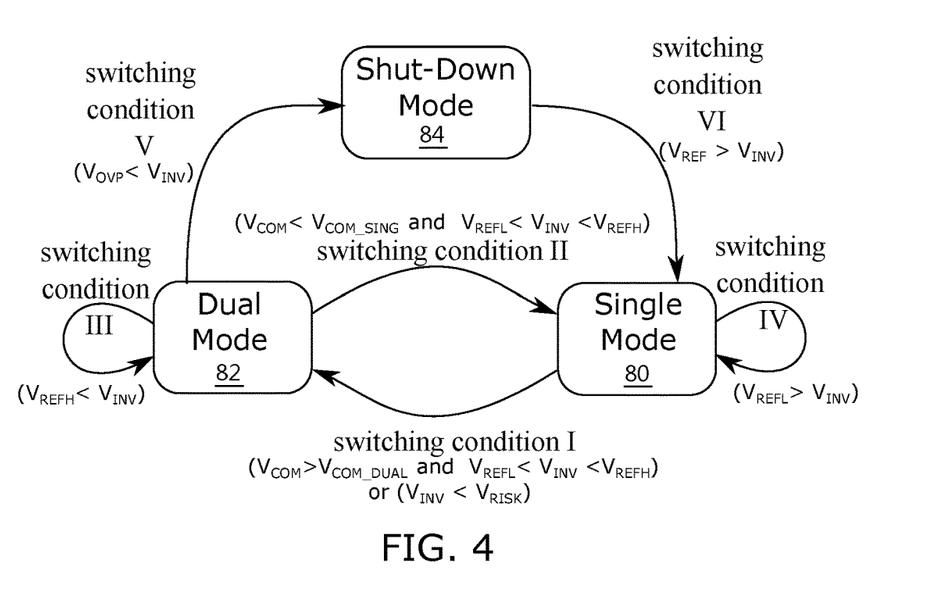
FIG. 4 demonstrates the switching conditions between the three operation modes: DM 82, SM 80, and SDM 84.
Figure 5:
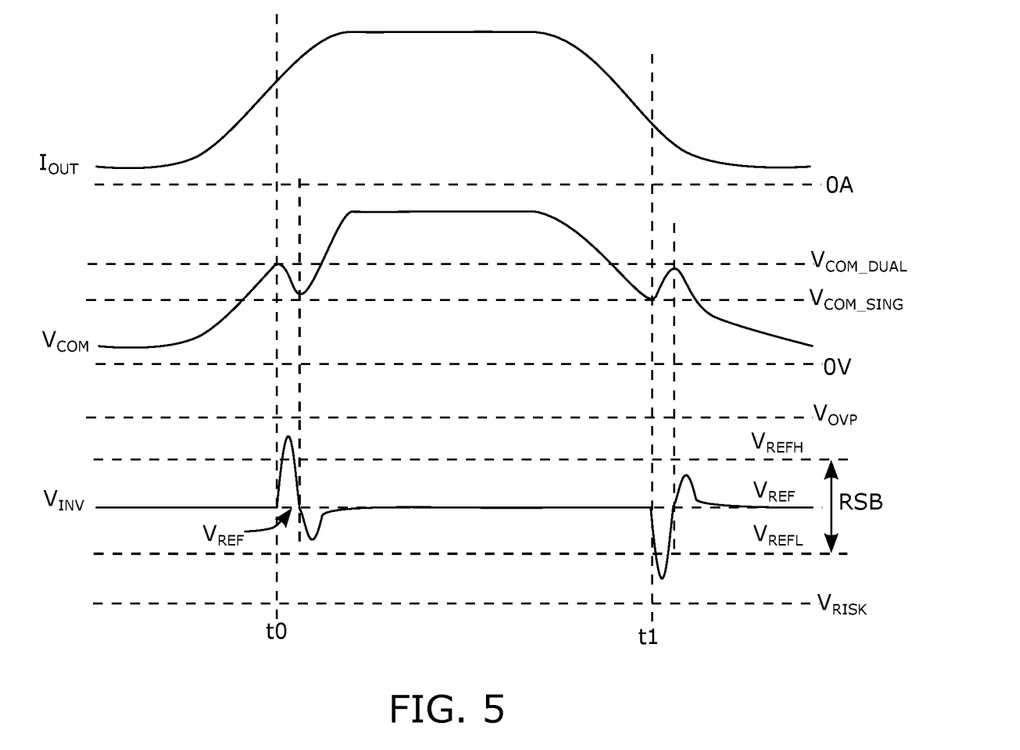
FIG. 5 shows the waveforms of output current $I_{OUT}$, compensation signal $V_{COM}$, and feedback signal $V_{INV}$ to illustrate how the operation modes switch responding to load variations.

FIG. 4 demonstrates the switching conditions between the three operation modes: DM 82, SM 80, and SDM 84, which are managed by architecture management circuit 110. FIG. 5 shows the waveforms of output current $I_{OUT}$, compensation signal $V_{COM}$, and feedback signal $V_{INV}$ to illustrate how the operation modes switch responding to load variations. FIG. 5 also demonstrates switching-reference levels $V_{COM\_DUAL}$ and $V_{COM\_SING}$ used to compare with compensation signal $V_{COM}$. Generally, when compensation signal $V_{COM}$ is greater than switching-reference level $V_{COM\_DUAL}$, DM 82 should be adopted, and when compensation signal $V_{COM}$ is less than switching-reference level $V_{COM\_SING}$, SM 80 should be adopted. FIG. 5 also demonstrates over-voltage-protection (OVP) level $V_{OVP}$, upper boundary $V_{REFH}$, reference voltage $V_{REF}$, lower boundary $V_{REFL}$, and under-voltage level $V_{RISK}$, all used to compare with feedback signal $V_{INV}$. Upper boundary $V_{REFH}$ and lower boundary $V_{REFL}$ are two boundaries that define stable range RSB in between. In normal conditions when output power source VOUT is well regulated, feedback signal $V_{INV}$ is approximately equal to reference voltage $V_{REF}$, the center of stable range RSB defined by upper boundary $V_{REFH}$ and lower boundary $V_{REFL}$. Therefore, if feedback signal $V_{INV}$ is not within stable range RSB, output power source VOUT is considered unstable or in a transient state. When feedback signal $V_{INV}$ is within stable range RSB between upper boundary $V_{REFH}$ and lower boundary $V_{REFL}$, output power source VOUT is considered stable or in a stable state.

According to one embodiment of the invention, when output power source VOUT is in the transient state, architecture management circuit 110 does not switch the operation mode of interleaved power converter 100 unless output power source VOUT has become over-high or over-low. When output power source VOUT is in the stable state, architecture management circuit 110 switches the operation mode of interleaved power converter 100 based on compensation signal $V_{COM}$.

In FIG. 4, switching condition I causes interleaved power converter 100 to switch from SM 80 to DM 82; switching condition II causes interleaved power converter 100 to switch from DM 82 to SM 80; switching condition III forces interleaved power converter 100 to remain in DM 82 and prevents power stage PH2 from being disabled; switching condition IV forces interleaved power converter 100 to remain in SM 80 and prevents power stage PH2 from being enabled; switching condition V causes interleave power converter 100 to switch from DM 82 to SDM 84, disabling both power stage PH1 and PH2; and switching condition VI forces interleaved power converter 100 to switch from SDM 84 to SM 80. Switching conditions I-VI are described as follows:

$(V_{COM} > V_{COM\_DUAL}$ and $V_{REFL} < V_{INV} < V_{REFH})$ or $V_{INV} < V_{RISK}$.      Switching condition I:

$V_{COM} < V_{COM\_SING}$ and $V_{REFL} < V_{INV} < V_{REFH}$.      Switching condition II:

$V_{INV} > V_{REFH}$.      Switching condition III:

$V_{INV} < V_{REFL}$.      Switching condition IV:

$V_{INV} > V_{OVP}$.      Switching condition V:

$V_{INV} < V_{REF}$.      Switching condition VI:

In one embodiment, if high-voltage signal $V_{HIN}$ indicates that AC mains voltage $V_{AC}$ is less than a predetermined value, 90 VAC for example, then regardless of compensation signal $V_{COM}$, interleaved power converter 100 can operate in DM 82 or SDM 84, but cannot operate in SM 80. When high-voltage signal $V_{HIN}$ indicates that AC mains voltage $V_AC$ is greater than the predetermined value, interleaved power converter 100 is allowed to operate in SM 80.

Please refer to FIGS. 4 and 5. In FIG. 5, as shown by the waveform of output current $I_{OUT}$, the load starts as a light load, and then transitions to a heavy load, and finally returns to a light load. Therefore, at the beginning of FIG. 5, because compensation signal $V_{COM}$ is below switching-reference level $V_{COM}S_{ING}$, interleaved power converter 100 operates in SM 80, only enabling power stage PH1 to convert power.

At moment t0 in FIG. 5, architecture management circuit 110 detects that switching condition I is met, which means that compensation signal $V_{COM}$ rises across switching-reference level $V_{COM\_DUAL}$, and output power source VOUT is considered to be stable. Therefore, interleaved power converter 100 switches to DM 82, enabling power stage PH2 to jointly provide power conversion together with power stage PH1. The operation status of power stage PH2 is switched from disable to enable at moment t0.

Due to the sudden introduction of power stage PH2, output power source VOUT rises rapidly, causing feedback signal $V_{INV}$ to exceed upper boundary $V_{REFH}$ and no longer stay within stable range RSB, the range between upper boundary $V_{REFH}$ and lower boundary $V_{REFL}$. Therefore, output power source VOUT is now considered as being in a transient state. As shown in FIG. 4, since switching condition III is already satisfied, interleaved power converter 100 operates in DM 82 continuously, and the operation status of power stage PH2 is prevented from being switched from enable to disable. The time when switching condition III is met serves as a blanking period, during which architecture management circuit 110 automatically ignores the changes in compensation signal $V_{COM}$ unless output power source VOUT is over high.

Refer to FIG. 5. Between moments t0 and t1, the control loop of interleaved power converter 100 causes feedback signal $V_{INV}$ to converge to approximately reference voltage $V_{REF}$, making output power source VOUT return to a steady state. Compensation signal $V_{COM}$ will vary with output current $I_{OUT}$, and interleaved power converter 100 operates in DM 82, as shown in FIG. 5.

In the event that output power source VOUT is over high as feedback signal $V_{INV}$ reaches OVP level $V_{OVP}$, switching condition V is met and interleaved power converter 100 enters SDM 84, disabling both power stages PH1 and PH2. SDM 84 continues until feedback signal $V_{INV}$ drops to approximately reference voltage $V_{REF}$, and then interleaved power converter 100 resumes to operate in SM 80, enabling only power stage PH1, as switching condition VI is met.

At moment t1 in FIG. 5, architecture management circuit 110 identifies that switching condition II is met, where compensation signal $V_{COM}$ is below switching-reference level $V_{COM\_SING}$ and output power source VOUT meets the steady-state output criteria as feedback signal $V_{INV}$ is within stable range RSB. Therefore, interleaved power converter 100 switches from DM 82 to SM 80, causing power stage PH2 to be disabled and leaving only power stage PH1 to provide power conversion.

Due to the sudden detachment of power stage PH2, output voltage $V_{OUT}$ of output power source VOUT rapidly drops, causing feedback signal $V_{INV}$ to be lower than lower boundary $V_{REFL}$, no longer staying in stable range RSB. As shown in FIG. 4, since switching condition IV is already met, interleaved power converter 100 continues to operate in SM 80. The time when switching condition IV is met serves as another blanking period, during which architecture management circuit 110 automatically ignores the changes in compensation signal $V_{COM}$ unless output power source VOUT is over-lower. After moment t1 in FIG. 5, with the decrease of output current $I_{OUT}$ and the control loop of interleaved power converter 100, feedback signal $V_{INV}$ converges to approximately reference voltage $V_{REF}$, compensation signal $V_{COM}$ varies with output current $I_{OUT}$, and interleaved power converter 100 operates in SM 80.

In the event that feedback signal $V_{INV}$ drops below under-voltage level $V_{RISK}$, interleaved power converter 100 will be forced to switch to DM 82 to quickly raise output power source VOUT and avoid system failures caused by over-low output power source VOUT.

Switching condition V causes interleaved power converter 100 to switch from DM 82 to SDM 84, preventing output voltage $V_{OUT}$ from becoming too high and damaging the electronic load powered by output power source VOUT.

Switching condition VI causes interleaved power converter 100 to switch from SDM 84 to SM 80, allowing interleaved power converter 100 to operate in SM 80 and resume power supply to the load.

Figure 6:
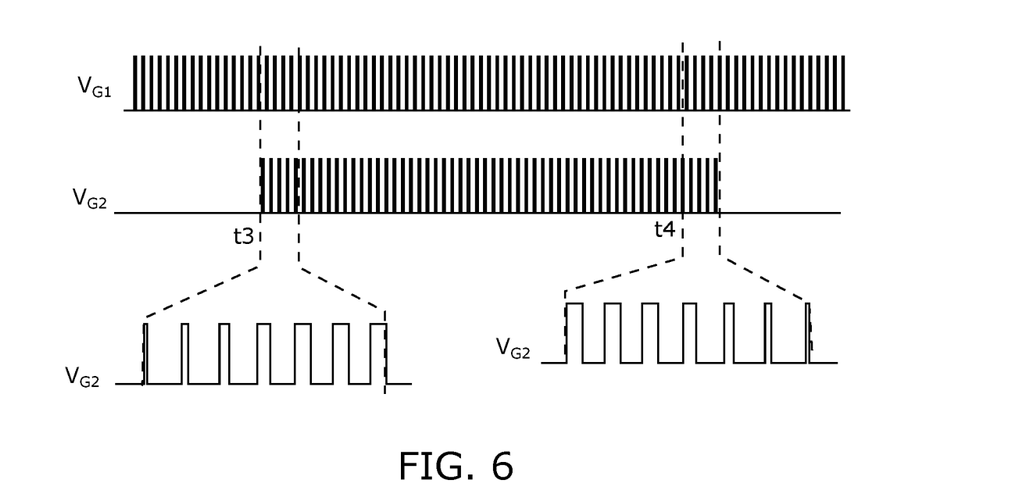
FIG. 6 shows waveforms of gate signals $V_{G1}$ and $V_{G2}$, and indicates that power stage PH2 has soft-in and soft-out functions.

FIG. 6 shows waveforms of gate signals $V_{G1}$ and $V_{G2}$, and indicates that power stage PH2 has soft-in and soft-out functions. As shown in FIG. 6, right after power stage PH2 is just enabled or disabled, ON time $T_{ON2}$ of power stage 2 gradually and monotonously changes cycle by cycle for several switching cycles.

The soft-in function approximately starts at moment t3 in FIG. 6. At moment t3, architecture management circuit 110 notifies digital phase control unit 108 to switch power stage PH2 from a disabled state to an enabled state. Therefore, gate signal $V_{G2}$ begins to appear periodically in pulses. Please note that from moment t3 onwards, after power stage PH2 is enabled, digital phase control unit 108 collaborates with ON-time controller LG2 to gradually increase the pulse width of gate signal $V_{G2}$, that is, ON time $T_{ON2}$, switching cycle by switching cycle until ON time $T_{ON2}$ is limited by compensation signal $V_{COM}$.

The soft-out function approximately starts at moment t4 in FIG. 6. At moment t4, architecture management circuit 110 notifies digital phase control unit 108 to switch power stage PH2 from an enabled state to a disabled state. Starting from moment t4 onwards, digital phase control unit 108 collaborates with ON-time controller LG2 to gradually reduce the pulse width of gate signal $V_{G2}$, that is, ON time $T_{ON2}$, switching cycle by switching cycle, from a length limited by compensation signal $V_{COM}$, until ON time $T_{ON2}$ is less than or equal to a minimum ON time, at which point power stage PH2 is completely disabled, and power switch Q2 is constantly kept OFF.

The soft-in and soft-out functions introduced to power stage PH2 can avoid the problem of excessive voltage ripple of output power source VOUT that may be caused by sudden attachment or detachment of power stage PH2.

Figure 7:
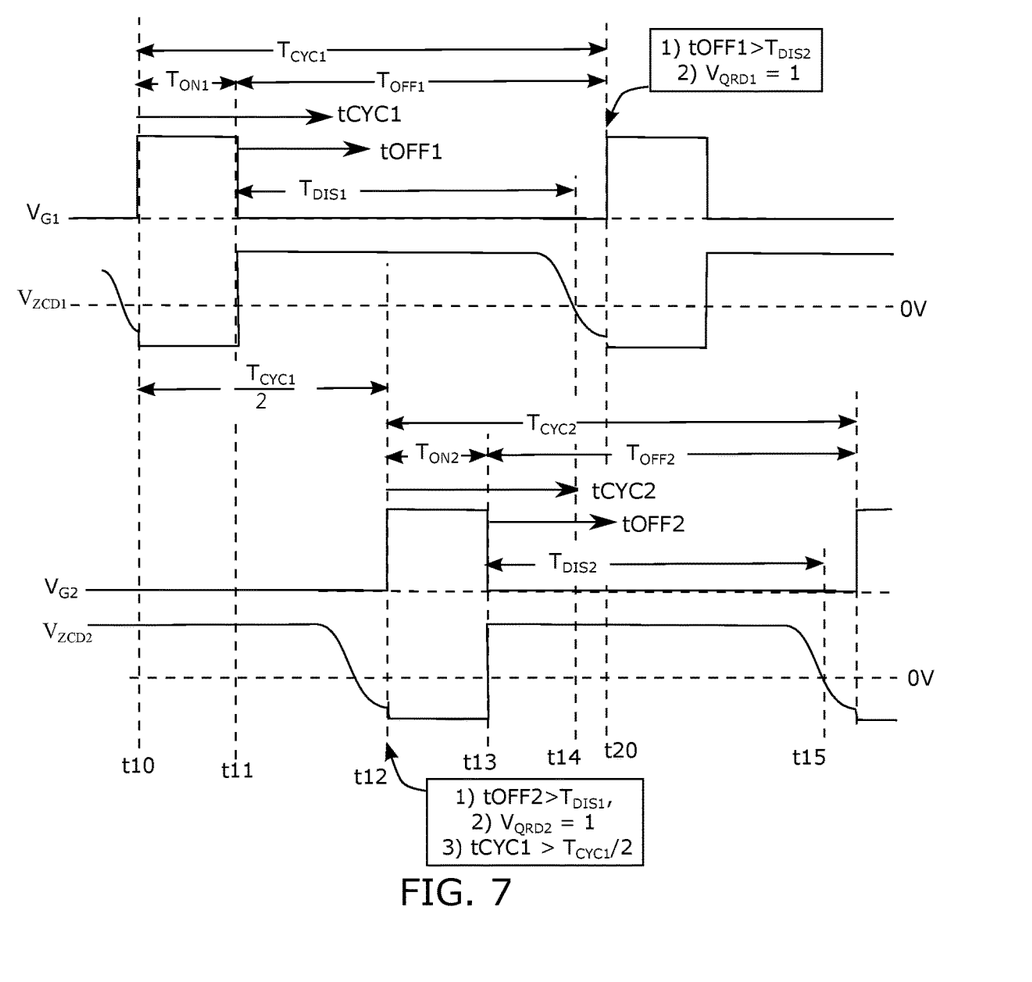
FIGS. 7 and 8 show the waveforms of gate signal $V_{G1}$, zero-current detection signal $V_{ZCD1}$, gate signal $V_{G2}$, and zero-current detection signal $V_{ZCD2}$, and explain the conditions for the starts of ON times $T_{ON1}$ and $T_{ON2}$ when interleaved power converter 100 operates in DM 82.

FIG. 7 shows the waveforms of gate signal $V_{G1}$, zero-current detection signal $V_{ZCD1}$, gate signal $V_{G2}$, and zero-current detection signal $V_{ZCD2}$, and explains the conditions for the starts of ON times $T_{ON1}$ and $T_{ON2}$ when interleaved power converter 100 operates in DM 82.

Please refer to FIGS. 2 and 7. As previously described, digital phase control unit 108 in FIG. 2 counts present cycle time tCYC1, present OFF time tOFF1, present cycle time tCYC2, and present OFF time tOFF2, and records or updates ON time $T_{ON1}$, discharge time $T_{DIS1}$, cycle time $T_{CYC1}$, ON time $T_{ON2}$, discharge time $T_{DIS2}$, and cycle time $T_{cyc2}$ that just concluded. According to previous teachings regarding FIG. 2, both ON times $T_{ON1}$ and $T_{ON2}$ are determined based on compensation signal $V_{COM}$.

At moment t10 in FIG. 7, gate signal $V_{G1}$ turns ON power switch Q1, digital phase control unit 108 updates cycle time $T_{CYC1}$ using present cycle time tCYC1, and then starts counting present cycle time tCYC1 from 0. At moment t11, gate signal $V_{G1}$ turns OFF power switch Q1, digital phase control unit 108 updates ON time $T_{ON1}$ using present cycle time tCYC1, and starts counting present OFF time tOFF1 from 0. Power switch Q1 is turned ON for ON time $T_{ON1}$. At moment t14 when zero-current detection signal $V_{ZCD1}$ drops cross 0V, digital phase control unit 108 updates discharge time $T_{DIS1}$ using present OFF time $t_{OFF1}$. At moment t20, power switch Q1 has been turned OFF for OFF time $T_{OFF1}$, and digital phase control unit 108 repeats the same actions as at moment t10.

Similarly, digital phase control unit 108 updates cycle time $T_{CYC2}$ using present cycle time tCYC2 at moment t12, ON time $T_{ON2}$ using present cycle time tCYC2 at moment t13, and discharge time $T_{DIS2}$ using present OFF time tOFF2 at moment t15.

According to one embodiment of the invention, digital phase control unit 108 compares present OFF time tOFF1 of power stage PH1 and discharge time $T_{DIS2}$ of power stage PH2. Only when present OFF time tOFF1 is greater than discharge time $T_{DIS2}$, the pulse of resonance detection signal $V_{QRD1}$ (equivalent to "1" in logic) is allowed to turn ON power switch Q1 and start the next switching cycle of power stage PH1. As shown in FIG. 7, at moment t20, digital phase control unit 108 finds that present OFF time tOFF1 is greater than discharge time $T_{DIS2}$, and resonance detection signal $V_{QRD1}$ is "1" in logic, so the next switching cycle of power stage PH1 is started. Simply speaking, digital phase control unit 108 limits OFF time $T_{OFF1}$ to not be shorter than discharge time $T_{DIS2}$, and OFF time $T_{OFF1}$ ends when resonance detection signal $V_{QRD1}$ shows that a valley, a local minimum, is occurring at node N1 in FIG. 1. Power stage PH1 operates in quasi-resonance.

Similarly, digital phase control unit 108 can also limit OFF time $T_{OFF2}$ to not be less than discharge time $T_{DIS1}$, as shown in FIG. 7. Nevertheless, the condition for starting the next switching cycle of power stage PH2, in comparison with that for starting the next switching cycle of power stage PH1, has an additional sub-condition, which is to maintain a phase difference of 180 degrees between power stages PH1 and PH2. The beginning of a switching cycle of power stage PH2 is only allowed after present cycle time tCYC1 has passed half of cycle time $T_{CYC1}$. As shown in FIG. 7, at moment t12, digital phase control unit 108 compares present OFF time tOFF2 with discharge time $T_{DIS1}$ of power stage PH1. Only when 1) present OFF time tOFF2 is greater than discharge time $T_{DIS1}$, 2) resonance detection signal $V_{QRD1}$ is "1" in logic, and 3) present cycle time tCYC1 has passed half of cycle time $T_{CYC1}$, power switch Q2 is turned ON to begin the next switching cycle of power stage PH2. In other words, a new switching cycle of power switch Q2 is prevented from starting until the three sub-conditions are met. Both power stages PH1 and PH2 operate in quasi-resonance.

In FIG. 7, by using the discharge time of one power stage to limit the OFF time of the other power stage, it can ensure that both will operate in CRM or DCM, and the phase difference between the two power stages is 180 degrees.

Figure 8:
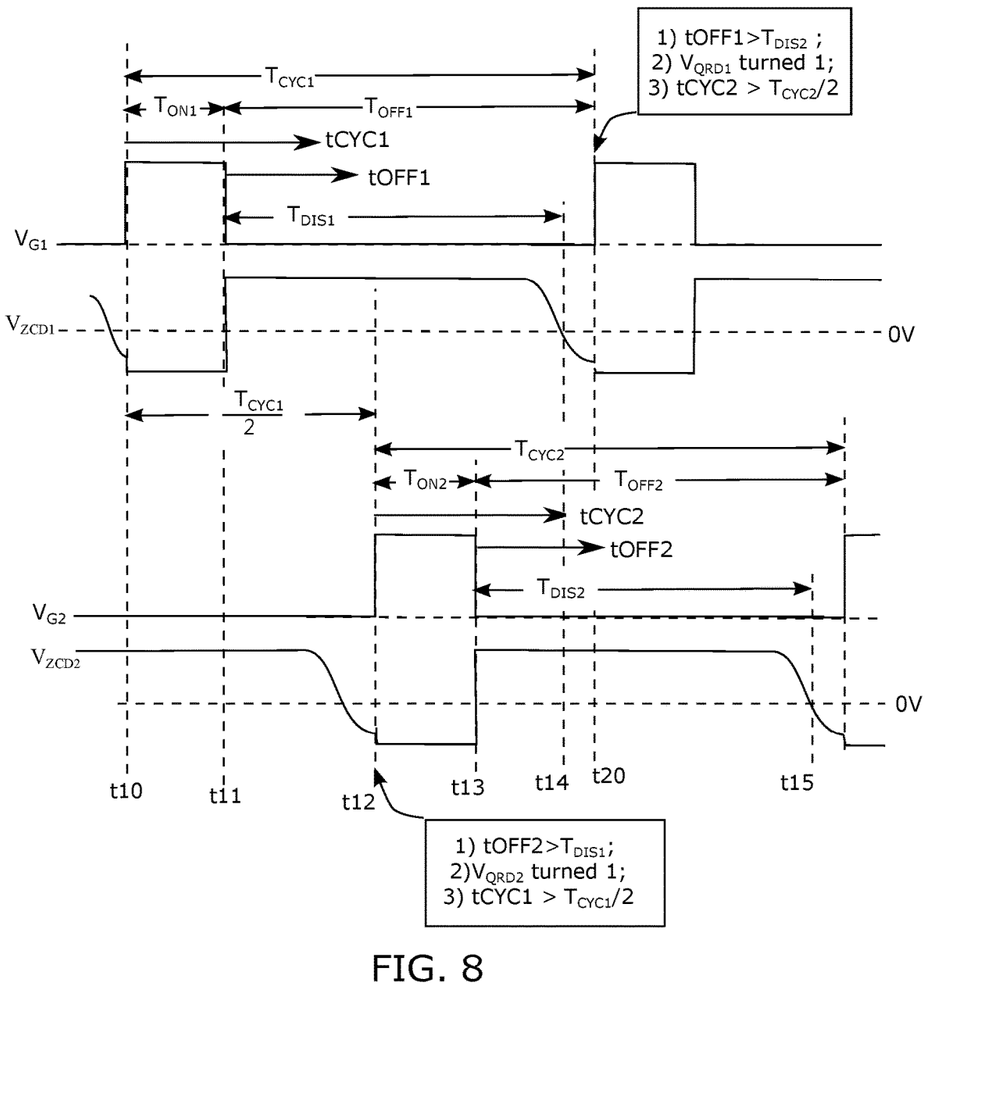

FIG. 8 shows the waveforms of gate signal $V_{G1}$, zero-current detection signal $V_{ZCD1}$, gate signal $V_{G2}$, and zero-current detection signal $V_{ZCD2}$, and explains the conditions for the start of ON times $T_{ON1}$ and $T_{ON2}$ when interleaved power converter 100 operates in DM 82. The similarity between FIGS. 8 and 7 can be understood through the previous explanation of FIG. 7 and will not be repeated here.

The difference between FIGS. 8 and 7 lies in the conditions for the start of ON times $T_{ON1}$ and $T_{ON2}$. In FIG. 7, the conditions for the starts of ON times $T_{ON1}$ and $T_{ON2}$ are not analogous and have obvious differences. However, in FIG. 8, the conditions for the starts of ON times $T_{ON1}$ and $T_{ON2}$ are totally analogous. For example, the beginning of ON time $T_{ON1}$ requires three sub-conditions to be met: 1) present OFF time tOFF1 is greater than discharge time $T_{DIS2}$; 2) the first pulse of resonance detection signal $V_{QRD1}$ within the present switching cycle of power stage PH1 has appeared; and 3) present cycle time tCYC2 is greater than half of cycle time $T_{CYC2}$. Analogously, the beginning of ON time $T_{ON2}$ requires three sub-conditions to be met: 1) present OFF time tOFF2 is greater than discharge time $T_{DIS1}$; 2) the first pulse of resonance detection signal $V_{QRD2}$ within the present switching cycle of power stage PH2 has appeared; and 3) present cycle time tCYC1 is greater than half of cycle time $T_{CYC1}$. These sub-conditions enable power stages PH1 and PH2 to turn ON a power switch once resonance starts, unnecessary to wait until the appearance of a valley, and unlimited to operate in quasi-resonance operation. These sub-conditions also ensure that power stages PH1 and PH2 have a phase difference of 180 degrees and will both operation in CRM or DCM.

While the invention has been described by way of examples and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method in use of an interleaved power converter with first and second power stages for generating an output power source, the control method comprising:
   generating a compensation signal in response to a feedback signal and a reference voltage, wherein the feedback signal represents the output power source;
   controlling an output power of the first power stage to supply to the output power source in response to the compensation signal;
   switching an operation status of the second power stage in response to the compensation signal and the feedback signal; and
   preventing the operation status from being switched when the feedback signal is beyond a stable range covering the reference voltage.

2. The control method as claimed in claim 1, comprising:
   enabling the second power stage to provide power to the output power source when the compensation signal exceeds a first switching-reference level and the feedback signal is within the stable range; and
   disabling the second power stage when the compensation signal is less than a second switching-reference level and the feedback signal is within the stable range, so the second power stage stops providing power to the output power source;
   wherein the first switching-reference level is higher than the second switching reference level.

3. The control method as claimed in claim 2, wherein the stable range provides an upper boundary higher than the reference voltage, and the control method comprises:
   preventing the second power stage from being disabled when the feedback signal exceeds the upper boundary and the compensation signal is less than the second switching-reference level.

4. The control method as claimed in claim 3, comprising:
   disabling both the first and second power stages when the feedback signal exceeds an over-voltage-protection level higher than the upper boundary.

5. The control method as claimed in claim 2, wherein the stable range provides a lower boundary less than the reference voltage, and the control method comprises:
   preventing the second power stage from being enabled when the feedback signal is lower than the lower boundary and the compensation signal is higher than the first switching-reference level.

6. The control method as claimed in claim 5, comprising:
   enabling both the first and second power stages when the feedback signal is less than an under-voltage level lower than the lower boundary.

7. The control method as claimed in claim 1, wherein the second power stage includes a power switch, and the control method comprises:
- changing an ON time of the power switching monotonically for switching cycles after changing the operation status of the second power stage.

8. The control method as claimed in claim 7, comprising:
- after the operation status is switched from disable to enable, increasing the ON time of the power switch switching cycle by switching cycle for the switching cycles until the ON time is limited by the compensation signal.

9. The control method as claimed in claim 7, comprising:
- after the operation status is switched from enable to disable, decreasing the ON time of the power switch switching cycle by switching cycle for the switching cycles; and
- keeping the power switch OFF after the switching cycles.

10. A power controller in use of an interleaved power converter with first and second power stages for generating an output power source, the power controller comprising:
- an architecture management circuit, for switching an operation of the interleaved power converter in response to a compensation signal and a feedback signal, wherein the compensation signal is generated by comparing the feedback signal with a reference voltage, and the feedback signal is a representative of the output power source; and
- a phase control unit, controlling the first and second power stages in response to the architecture management circuit;
- wherein the architecture management circuit switches the operation from a first mode to a second mode when the compensation signal goes across a first switching-reference level, and the feedback signal is within a stable range covering the reference voltage; and
- the architecture management circuit keeps the operation as the first mode when the compensation signal goes across the first switching-reference level, and the feedback signal is not within the stable range.

11. The power controller as claimed in claim 10, wherein the architecture management circuit switches the operation from the first mode to the second mode when the compensation signal exceeds the first switching-reference level and the feedback signal is within the stable range, and the architecture management circuit switches the operation from the second mode to the first mode when the compensation signal is below a second switching-reference level less than the first switching-reference level and the feedback signal is within the stable range.

12. The power controller as claimed in claim 10, wherein the architecture management circuit switches the operation to a shut-down mode disabling both the first and second power stages when the feedback signal is more than an over-voltage protection level higher than the reference voltage, and switches the operation from the shut-down mode to a single mode enabling only one of the first and second power stages when the feedback signal drops to the reference voltage.

13. The power controller as claimed in claim 12, wherein the architecture management circuit switches the operation to a dual mode enabling both the first and second power stages when the feedback signal is less than an under-voltage level lower than the reference voltage.

14. A control method in use of an interleaved power converter comprising first and second power stages connected in parallel, wherein each power stage has a power switch and an inductive device, the control method comprising:
- turning ON a first power switch of the first power stage for a first ON time;
- turning ON a second power switch of the second power stage for a second ON time;
- recording a second discharge time of a second inductive device in the second power stage; and
- making a first OFF time of the first power switch not less than the second discharge time.

15. The control method as claimed in claim 14, comprising:
- recording a first discharge time of a first inductive device in the first power stage; and
- making a second OFF time of the second inductive device not less than the first discharge time.

16. The control method as claimed in claim 14, comprising:
- preventing a second switching cycle of the second power switch from starting until a first cycle time of the first power switch lasts more than half of a first previous cycle time of the first power switch.

17. The control method as claimed in claim 16, comprising:
- preventing a first switching cycle of the first power switch from starting until a second cycle time of the second power switch lasts more than half of a second previous cycle time of the second power switch.

18. The control method as claimed in claim 14, comprising:
- determining whether a first node of the first inductive device has a first local minimum; and
- allowing the first OFF time to end when the first node has the first local minimum.

19. The control method as claimed in claim 14, comprising:
- determining whether a first node of the first inductive device has a first local minimum during the first OFF time; and
- allowing the first OFF time to end after the first node has had the first local minimum.

20. The control method as claimed in claim 14, comprising:
- determining the first ON time in response to a compensation signal; and
- determining the second ON time in response to the compensation signal.

\* \* \* \* \*